United States Patent
Hamada et al.

(10) Patent No.: US 9,776,269 B2
(45) Date of Patent: Oct. 3, 2017

(54) REPLACEMENT DETERMINATION DEVICE FOR ELECTRICAL DISCHARGE MACHINING ELECTRODE AND REPLACEMENT DETERMINATION METHOD

(75) Inventors: Kyoichi Hamada, Aiko-gun (JP); Nobuaki Igi, Aiko-gun (JP); Hiroshi Hazome, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 391 days.

(21) Appl. No.: 14/418,909

(22) PCT Filed: Jul. 31, 2012

(86) PCT No.: PCT/JP2012/069498
§ 371 (c)(1),
(2), (4) Date: Jan. 30, 2015

(87) PCT Pub. No.: WO2014/020709
PCT Pub. Date: Feb. 6, 2014

(65) Prior Publication Data
US 2015/0209884 A1    Jul. 30, 2015

(51) Int. Cl.
| B23H 11/00 | (2006.01) |
| B23H 1/02 | (2006.01) |
| B23H 7/14 | (2006.01) |
| B23H 7/20 | (2006.01) |
| B23H 9/14 | (2006.01) |

(52) U.S. Cl.
CPC .............. *B23H 11/00* (2013.01); *B23H 1/02* (2013.01); *B23H 7/14* (2013.01); *B23H 7/20* (2013.01); *B23H 9/14* (2013.01); *Y10T 29/53022* (2015.01)

(58) Field of Classification Search
CPC .................................. B23H 11/00; B23H 9/10
See application file for complete search history.

(56) References Cited

FOREIGN PATENT DOCUMENTS

| EP | 001629921 | * | 3/2016 |
| JP | 58-114821 | | 7/1983 |
| JP | 3007911 | | 2/2000 |
| JP | 2001-25922 | | 1/2001 |
| JP | 2005-144651 | | 6/2005 |
| WO | WO-01/89752 | | 11/2001 |

OTHER PUBLICATIONS

International Search Report dated Nov. 6, 2012, directed to International Application No. PCT/JP2012/069498; 2 pages.

* cited by examiner

*Primary Examiner* — Robert R Raevis
(74) *Attorney, Agent, or Firm* — Morrison & Foerster LLP (57) ABSTRACT

A replacement determination method: detects the remaining length of the electrode; detects the electrical discharge commencement position, being the position of the electrode when electrical discharge starts; detects the throughole position, being the position of the electrode when the workpiece is pierced; sets the required length for the electrode as required for machining the next throughhole, on the basis of the difference between the detected electrical discharge commencement position and the detected throughole position; compares the detected remaining length and the set required length; and determines whether or not electrode replacement is required.

5 Claims, 7 Drawing Sheets

REPLACEMENT DETERMINATION DEVICE FOR ELECTRICAL DISCHARGE MACHINING ELECTRODE AND REPLACEMENT DETERMINATION METHOD

CROSS REFERENCE TO RELATED APPLICATIONS

This application is a U.S. National Phase patent application of PCT/JP2012/069498, filed on Jul. 31, 2012, which is hereby incorporated by reference in the present disclosure in its entirety.

FIELD OF THE INVENTION

The present invention relates to a replacement judgment apparatus and replacement judgment method for an electrode for electrodischarge machining which judges a need for replacement of an electrode which is used for an electrodischarge machine.

BACKGROUND OF THE INVENTION

In the past, when using an electrodischarge machine for forming a fine hole in a workpiece, there has been known an apparatus designed to judge a need for replacement of an electrode while considering the ratio of consumption of an electrode for electrodischarge machining and a machining depth (plate thickness of workpiece) (for example, see PLT 1). In the apparatus which is described in this PLT 1, the required electrode length which is required for machining is calculated from a preset electrode consumption ratio and machining depth, an electrode length detecting means is used to detect a current electrode length, and, when the required electrode length is longer than the electrode length, it is judged that electrode replacement is necessary and advance to the electrodischarge machining process is stopped.

However, when using a turbine blade etc. as a workpiece, the plate thickness of the workpiece at the machining location is not necessarily constant. Therefore, if, like in the apparatus which is described in the above PLT 1, using a preset machining depth as the basis to calculate the required electrode length, the need for electrode replacement cannot be precisely judged. Further, there is waste in setting the electrode consumption ratio larger in view of safety and ending up replacing an electrode which can still be used.

PATENT LITERATURE

PLT 1: Japanese Patent No. 3007911

SUMMARY OF THE INVENTION

The present invention provides a replacement judgment apparatus for an electrode for electrodischarge machining which judges a need for replacement of an electrode which successively forms through holes in a workpiece by electrodischarge machining, comprising an electrode length detecting means for detecting a residual length of the electrode, an electrodischarge start position detecting means for detecting a position of the electrode at the time of start of electrodischarge as an electrodischarge start position, a penetration position detecting means for detecting a position of the electrode at the time of penetration through the workpiece as a penetration position, a required length setting means for using a difference between the electrodischarge start position which is detected by the electrodischarge start position detecting means and the penetration position which is detected by the penetration position detecting means as the basis to set a length of the electrode which is required for forming the next through hole, and a judging means for comparing the residual length which is detected by the electrode length detecting means and the required length which is set by the required length setting means to judge the need for electrode replacement.

Further, the present invention provides a replacement judgment method for an electrode for electrodischarge machining which judges a need for replacement of an electrode which successively forms through holes in a workpiece by electrodischarge machining, the replacement judgment method comprising detecting a residual length of the electrode, detecting a position of the electrode at the time of start of electrodischarge as an electrodischarge start position, detecting a position of the electrode at the time of penetration through the workpiece as a penetration position, using a difference between the electrodischarge start position which is detected and the penetration position which is detected as the basis to set a required length of the electrode which is required for forming the next through hole, and comparing the residual length which is detected and the required length which is set to judge the need for electrode replacement.

DETAILED DESCRIPTION OF THE INVENTION

Figure 1:
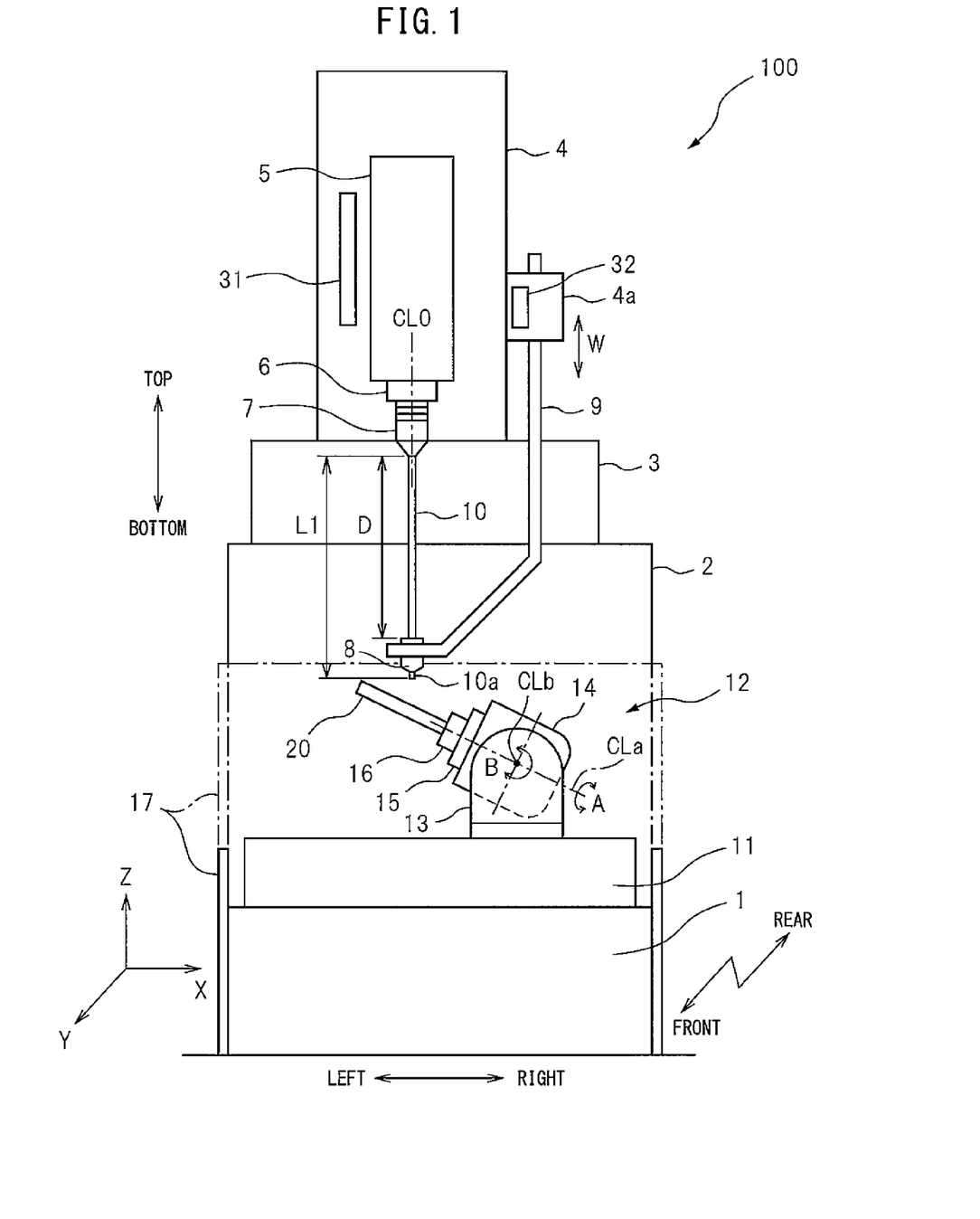
FIG. 1 is a front view which schematically shows the configuration of principal parts of an electrodischarge machine which has an electrode replacement judgment apparatus according to a first embodiment of the present invention.

Below, referring to FIG. 1 to FIG. 9, a first embodiment of a replacement judgment apparatus of an electrode for electrodischarge machining according to the present invention will be explained. FIG. 1 is a front view which schematically shows the configuration of the main parts of the electrodischarge machine 100 which has an electrode replacement judgment apparatus according to a first embodiment of the present invention. Note that, below, for convenience, as illustrated, the orthogonal 3-axial directions (X-axis direction, Y-axis direction, and Z-axis direction) are respectively defined as the left-right direction, front-rear direction, and top-bottom direction and the configurations of the parts are explained in accordance with these definitions.

In FIG. 1, at the rear of a foundation formed by a bed 1, a column 2 is provided standing up. At the top surface of the column 2, an X-slider 3 is supported to be able to slide in the X-axis direction (left-right direction). On the top surface of the X-slider 3, a ram 4 is supported to be able to move in the Y-axis direction (front-rear direction). At the front surface of the ram 4, a spindle head 5 is supported to be able to move in the Z-axis direction (top-bottom direction). At the bottom surface of the spindle head 5, a front end part of the rotary spindle 6 sticks out. At the bottom part of the rotary spindle 6, an electrode holder 7 is attached. Below the electrode holder 7 in the vertical direction, an electrode guide 8 is arranged. The electrode guide 8 is supported at a bottom end part of a holding arm 9. The holding arm 9 is supported by a bracket 4a which is provided at a right side surface of the ram 4 to be able to move in the top-bottom direction. The top-bottom movement axis of this holding arm 9 is defined as the W-axis.

Between the electrode holder 7 and the electrode guide 8, an electrode 10 extends along an axis CL0 in the top-bottom direction passing through the centers of the electrode holder 7 and the electrode guide 8. The electrode 10 is a cylindrical shaped pipe electrode and a top end part of the electrode 10 is supported by electrode holder 7. The bottom end part of the pipe electrode 10 runs through the electrode guide 8 in the top-bottom direction. The pipe electrode 10 is supported at the outer circumference by the electrode guide 8. The movement (swing) of the pipe electrode 10 is retrained in the front-rear and left-right directions while the pipe electrode 10 is able to slide in the electrode guide 8 in the top-bottom direction. Inside the pipe electrode 10, for example, water or other machining fluid is supplied. The machining fluid is ejected from the front end part (bottom end part) of the pipe electrode 10. Note that, for the machining fluid, oil may also be used.

At the top surface of the bed 1, a table 11 is arranged at the front of the column 2. At the top surface of the table 11, a slanted rotary table device 12 is carried. The slanted rotary table device 12 has a front-rear pair of support members 13 which are provided sticking upward from the top surface of the table 11, a slanted member 14 which is supported between the front-rear support members 13 to be able to pivot in the B-axis direction about a pivot axis CLb which extends in the Y-axis direction, and a rotary table 15 which is supported at a left end surface of the slanted member 14 to be able to rotate in the A-axis direction about a rotation axis CLa which is vertical to the pivot axis Lb. The rotary table 15 is provided with a chuck 16. The chuck 16 supports a workpiece 20. Around the table 11, a machining tank 17 is provided so as to be able to rise to cover the entire table 11 and slanted rotary table device 12. Note that, the one-dot chain line of the figure shows the state where the machining tank 17 is raised.

Figure 6:
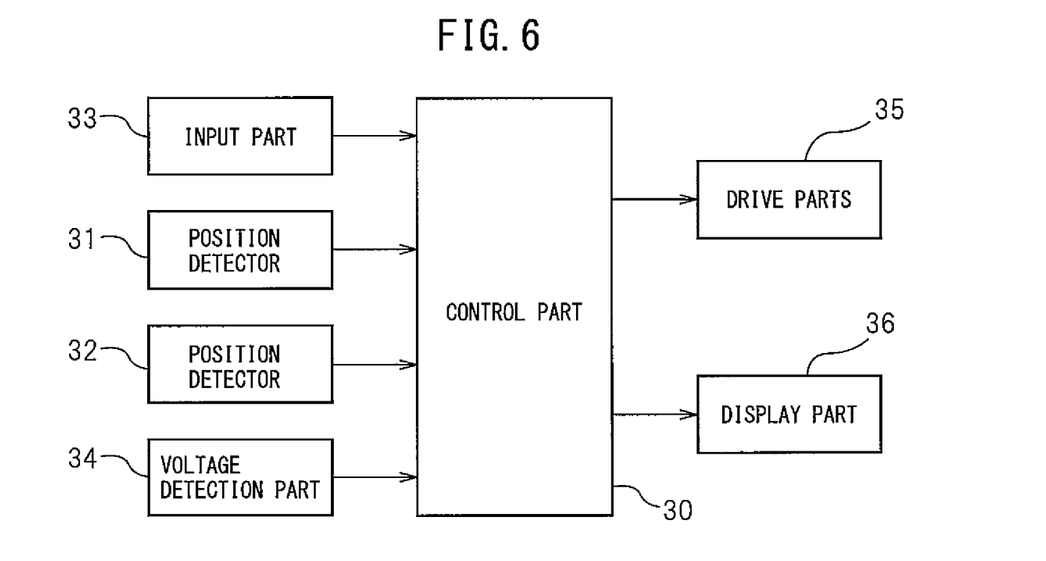
FIG. 6 is a block diagram which shows the configuration of an electrode replacement judgment apparatus according to a first embodiment of the present invention.

While not illustrated, the electrodischarge machine 100 of FIG. 1 has an X-axis use drive part which makes the X-slider 3 move in the left-right direction, a Y-axis use drive part which moves the ram 4 in the front-rear direction, a Z-axis use drive part which moves the spindle head 5 in the top-bottom direction, a spindle drive part which rotates the rotary spindle 6 about the axis CL0, an arm drive part which moves the holding arm 9 in the top-bottom direction, a B-axis use drive part which makes the pivot member 14 slant via the pivot axis CLb, and an A-axis use drive part which makes the rotary table 15 rotate via a rotation axis CLa. The X-axis use drive part, the Y-axis use drive part, the Z-axis use drive part, and the arm drive part are, for example, comprised of ball screws and servo motors which drive rotation of the ball screws, the spindle drive part is, for example, comprised of a spindle motor, and the B-axis use drive part and A-axis use drive part are, for example, comprised of DD (direct drive) servo motors. The above X-axis use drive part, Y-axis use drive part, Z-axis use drive part, arm drive part, spindle drive part, B-axis use drive part, and A-axis use drive part will sometimes be referred to all together as the drive parts 35 (FIG. 6). The drive parts 35 are controlled by the control part 30 (FIG. 6).

By the above configuration, the electrode holder 7 and the electrode guide 8 can move relative to the workpiece 20 in the X-axis direction, Y-axis direction, and Z-axis direction and can move relative to the workpiece 20 in the B-axis direction and A-axis direction. Therefore, the workpiece 20 can be machined to a desired three-dimensional shape. Further, by the arm drive part raising and lowering the holding arm 9, the distance between the electrode holder 7 and the electrode guide 8 can be adjusted. Despite consumption of the pipe electrode 10 and resultant change in length of the pipe electrode 10, during machining, the electrode holder 7 and the electrode guide 8 can always support the top-bottom ends of the pipe electrode 10.

At the front surface of the ram 4, a position detector 31a such as a linear scale is provided for detecting a Z-axis position in the top-bottom direction of the spindle head 5. The signal from the position detector 31 can be used to detect the position of the electrode holder 7, that is, the position of the top end part of the pipe electrode 10. At the bracket 4a of the holding arm 9, a position detector 32 is provided for detecting a W-axis position in the top-bottom direction of the holding arm 9 with respect to the ram 4. The signal from the position detector 32 can be used to detect the position of the electrode guide 8 with respect to the ram 4. Between the Z-axis position and the W-axis position, there is a certain relationship inherent to the machine (known value), so the signals of the position detectors 31 and 32 can be used to detect the distance D between the bottom end part of the electrode holder 7 and the top end part of the electrode guide 8. Note that, while not shown in the figures, at the side of the arm 9, an electrode magazine is provided. The electrode magazine holds a plurality of pipe electrodes 10 for replacement use which have initial lengths L0 (known). Between the spindle 6 and the tool magazine, a not shown changing means can be used to change the pipe electrode 10.

The workpiece 20 is, for example, a turbine blade or vane which is used for a gas turbine or jet engine etc. The turbine blade is exposed to a 1000° C. to 1500° C. or so high temperature gas, so a high heat resistant nickel alloy is used as the constituent material. At the surface of this turbine blade, for cooling the surface of the turbine blade, cooling holes are formed for passing cooling air.

Figure 2:
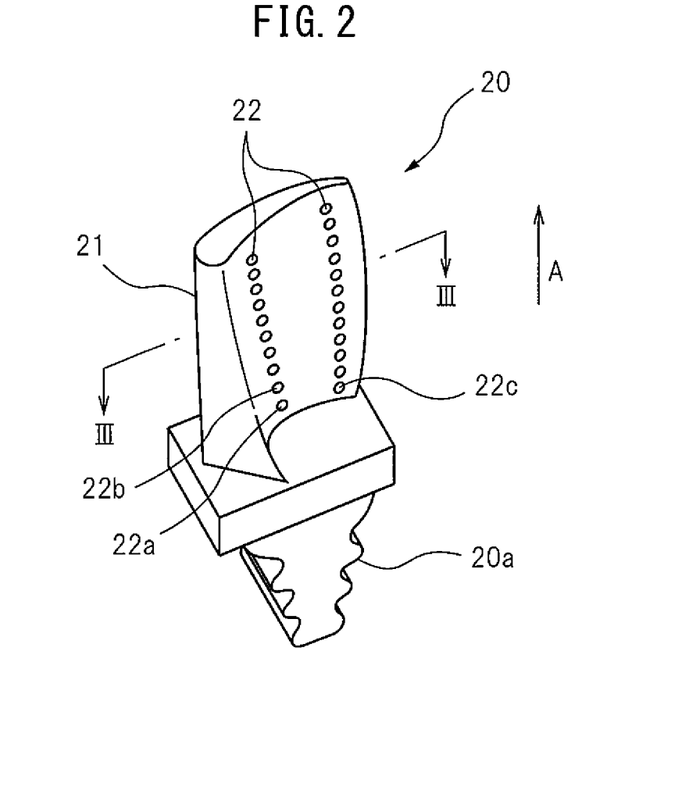
FIG. 2 is a perspective view of one example of a workpiece to which the present invention is applied as constituted by a turbine blade.
Figure 3:
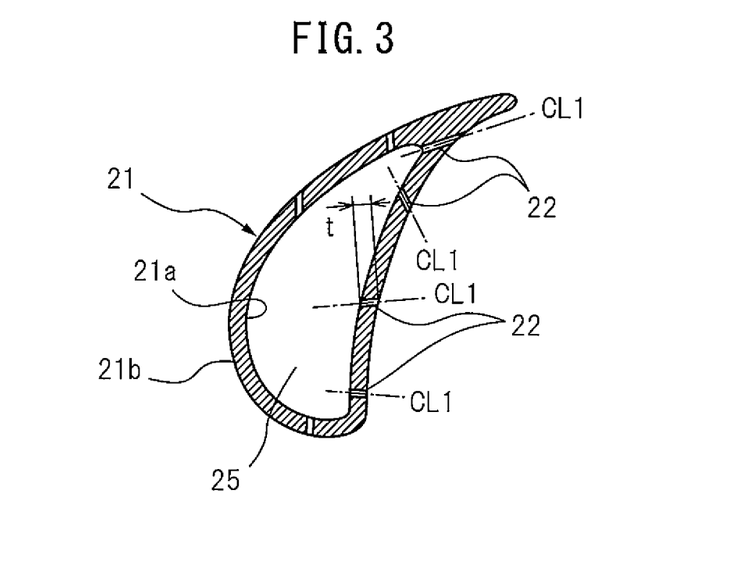
FIG. 3 is a cross-sectional view along the line III-III of FIG. 2.

FIG. 2 is a perspective view of a workpiece 20 (turbine blade), while FIG. 3 is a cross-sectional view along the line III-III of FIG. 2. At one end part of the turbine blade 20, for example, a Christmas tree shaped support part 20a is provided. The support part 20a is attached to the circumference of a rotatable rotor.

As shown in FIGS. 2 and 3, the turbine blade 20 is, for example, formed by the lost wax casting method. Inside the blade part 21, a hollow part 30 is formed. The blade part 21 has an inside surface 21a which faces the hollow part 30 and an outer surface 21b which is exposed to high temperature gas. The blade part 21 is formed with a large number of cooling holes 22 which pass through the blade part 21 at a plurality of locations in the circumferential direction of the blade part 21 and along the height direction A of the blade part 21 (arrow mark A direction of FIG. 2). The plate thickness t of the blade part 21 along the center axis CL1 of the cooling hole 22 is not constant and differs by location as shown in FIG. 3. At the hollow part 25, cooling air is supplied from the rotor side. Cooling air flows out from the cooling holes 22. Due to this, film-shaped cooling air flows out along the outer surface 21b whereby the blade part 21 is cooled.

The nickel alloy which forms the turbine blade is hard to machine, so it is difficult to use a drill etc. to form cooling holes 22. Therefore, in the present embodiment, an electro-discharge machine 100 is used to form the plurality of cooling holes 22 in the turbine blade. The cooling holes 22 are formed one location at a time. After one cooling hole 22a in FIG. 2 finishes being formed, another cooling hole 22b which adjoins this cooling hole 22a or another cooling hole 22c which is closest to the cooling hole 22a is formed.

Figure 4:
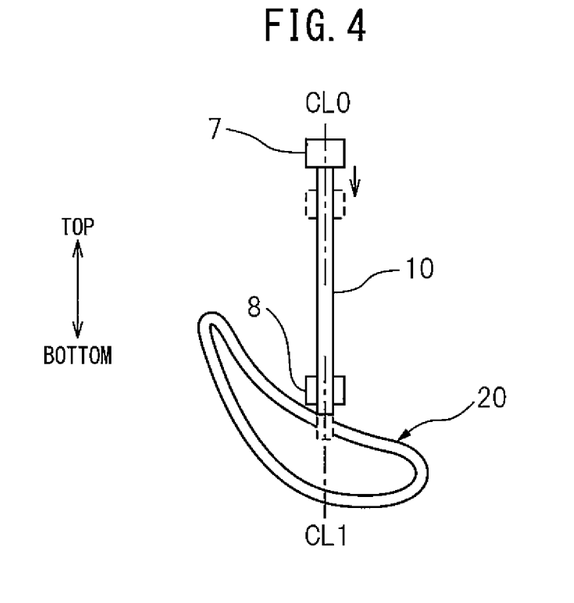
FIG. 4 is a view which shows a machining operation of a workpiece according to an electrodischarge machine of FIG. 1.
Figure 5:
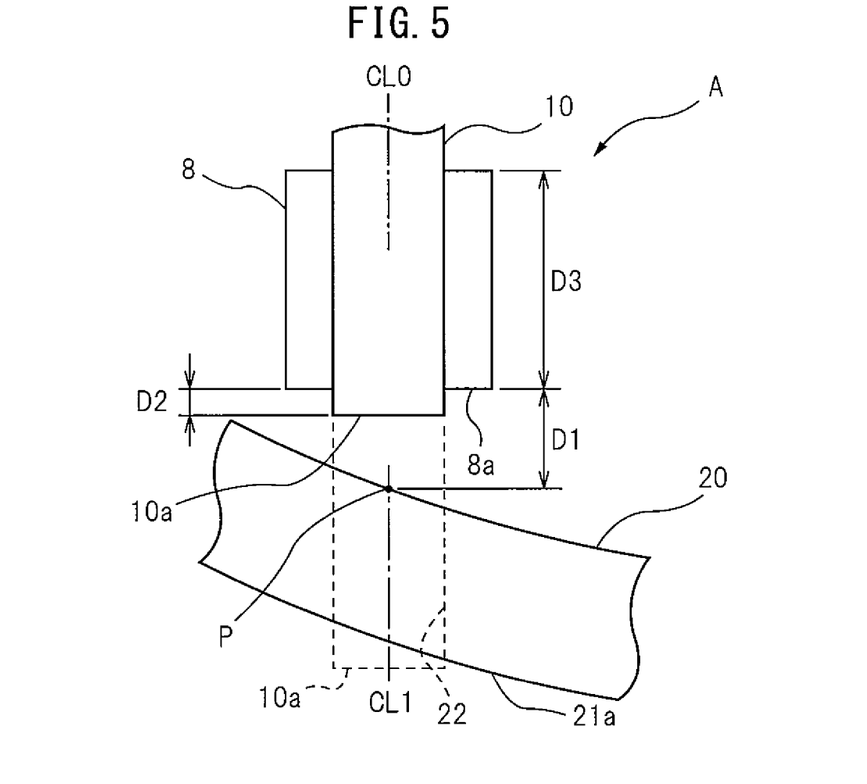
FIG. 5 is an enlarged view of principal parts of FIG. 4.

FIG. 4 is a view which shows a machining operation of a cooling hole 22, while FIG. 5 is an enlarged view of principal parts of FIG. 4. As shown in FIGS. 4 and 5, when forming a cooling hole 22, the slanted rotary table device 12 is used to hold the workpiece 20 so that the center axis CL1 of the cooling hole 22 extends in the top-bottom direction. Furthermore, the machining program is used to instruct the W-axis so that the bottom end face 8a of the electrode guide 8 is positioned at an electrode support position A exactly a predetermined distance D1 above the machining start point P. Further, the electrode holder 7 is moved while fastening the relative positions of the electrode holder 7 and the electrode guide 8. At this time, the amount of projection of the bottom end face 10a of the pipe electrode 10 which sticks out from the bottom end face of the electrode guide 8 is set to a predetermined value D2 (<D1).

Note that, the predetermined value D2 may be 0 or may be smaller than 0. If the predetermined value D2 is smaller than 0, the bottom end face 10a of the pipe electrode 10 is positioned above the bottom end face 8a of the electrode guide 8, but in this case, it is sufficient that the distance between the bottom end faces 8a and 10a be smaller than the length D3 of the electrode guide 8 so that the pipe electrode 10 not detach from the electrode guide 8. The above states will be referred to as the "machining preparation state".

Next, the electrode holder 7 is moved downward from the machining preparation state so as to move the pipe electrode 10 downward and the front end part of the pipe electrode 10 is used to machine the workpiece 20 by electrodischarge machining (broken lines of FIGS. 4 and 5). During the machining, the holding arm 9 is fastened with respect to the ram 4 so that regardless of downward movement of the electrode holder 7, the electrode guide 8 is supported at the electrode support position A. Due to this, the top-bottom end parts of the pipe electrode 10 are supported above the workpiece 20 and shaking of the pipe electrode 10 during machining can be suppressed. At the time of electrodischarge machining, the pipe electrode 10 is consumed along with formation of the cooling holes 22, so the pipe electrode 10 has to be replaced at a suitable timing. To judge this replacement timing, in the present embodiment, the electrode replacement judgment apparatus is configured as follows.

FIG. 6 is a block diagram which shows the configuration of an electrode replacement judgment apparatus according to a first embodiment. The control part 30 of FIG. 6 is configured including a processing system which comprises a CPU, ROM, RAM, and other peripheral circuits. The control part 30 is connected to the position detector 31 which detects a Z-axis position of the electrode holder 7 (FIG. 1), a position detector 32 which detects a W-axis position of the electrode guide 8 (FIG. 1), an input part 33 to which a machining program and various settings are input, a voltage detection part 34 which detects an interpolar voltage between the pipe electrode 10 and the workpiece 20, drive parts 35 which make the spindle 6 move relative to the workpiece 20 (X-axis use drive part, Y-axis use drive part, Z-axis use drive part, arm drive part, spindle drive part, B-axis use drive part, and A-axis use drive part), and a display part 36 which displays various types of information relating to electrode replacement judgment. The control part 30 uses the signals from the position detectors 31 and 32, input part 33, and voltage detector 34 as the basis to perform predetermined processing and outputs control signals to the drive part 35 and the display part 36.

Figure 7:
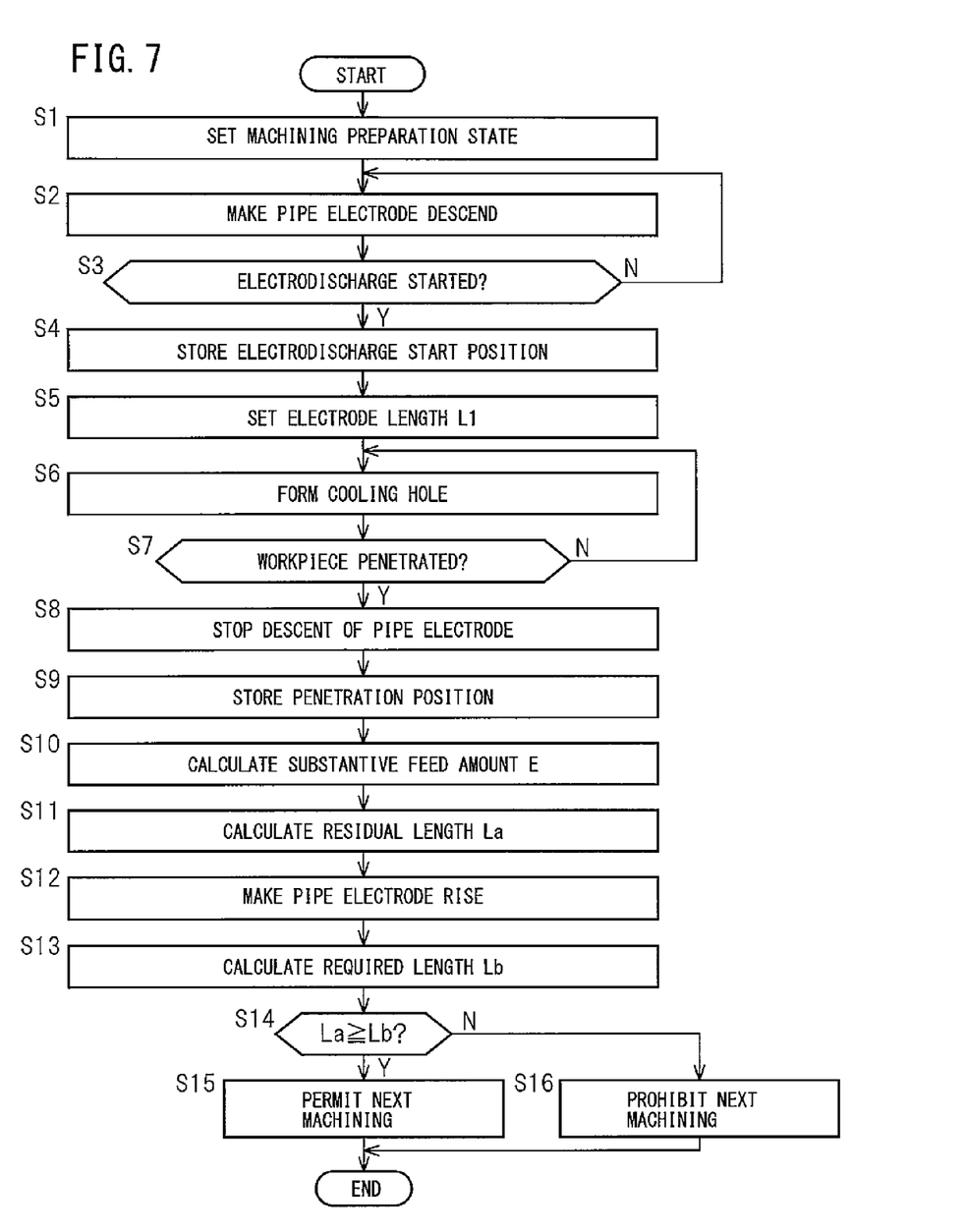
FIG. 7 is a flow chart which shows an example of the processing which is performed by a control part which forms part of the electrode replacement judgment apparatus according to the first embodiment of the present invention.

FIG. 7 is a flow chart which shows one example of the processing which is performed by the control part 30 according to the first embodiment. The processing which is shown in this flow chart is, for example, started by operation of the input part 33 to input a machining start command and is repeated each time an individual cooling hole 22 is formed. That is, FIG. 7 corresponds to the formation of a single cooling hole 22. By repeating the processing of FIG. 7, mutually adjoining cooling holes 22 are successively formed.

At step S1, the machining program is followed to output control signals to the drive parts 35 whereby the position/posture of the workpiece 20, the position of the electrode holder 7, and the position of the electrode guide 8 are set to the machining preparation state (FIGS. 4 and 5). That is, the workpiece 20 is held in the machining posture and the distance between the electrode guide 8 and the workpiece 20 is held constant. In that state, the top-bottom end parts of the pipe electrode 10 are held. In that state, the electrode holder 7 and the electrode guide 8 are integrally moved so that the bottom end face 8a of the electrode guide 8 is positioned at the electrode support position A above from the machining start point P by exactly a predetermined distance D1.

At step S2, a pulse voltage is applied to the pipe electrode 10 and control signals are output to the drive parts 35 (Z-axis use drive part, arm drive part, and spindle drive part), and, while holding the electrode guide 8 at the electrode support position A, the pipe electrode 10 is made to rotate by a predetermined speed while making it descend toward the machining start point P. Along with this, machining fluid is ejected from the front end part of the pipe electrode 10.

At step S3, it is judged if electrodischarge has started between the pipe electrode 10 and the workpiece 20. This judgment is performed by judging if the average value of the interpolar voltage which is detected by the voltage detection part 34 (average machining voltage V) has become smaller than a predetermined threshold value V1. In this case, the control part 30 reads the signal from the voltage detection part 34 for example every 2 msec, averages the data within the most recent predetermined time (for example 1 second), and makes this the average machining voltage V. If step S3 is affirmative, the routine proceeds to step S4, while if negative, the routine returns to step S2.

At step S4, the signal from the position detector 31 is read and the Z-axis position of the electrode holder 7 at the time judged to be the electrodischarge start is stored as the electrodischarge start position in a memory.

At step S5, the electrode length L1 is set. A new pipe electrode 10 which has a known initial length L0 (for example 300 mm) is firstly attached to the rotary spindle 6 manually or by an electrode changing system. The electrode length L1 is the distance from the bottom end of the electrode holder 7 to the bottom end face 10a of the pipe electrode 10. This electrode length L1 is first set to the initial length L0. The electrode length L1 when using a new pipe electrode 10 to form the n-th cooling hole 22 is set as follows. That is, when the electrodischarge start position when forming the n−1-th cooling hole 22 in the previous processing is $Z_{n-1}$ and the electrodischarge start position when forming the n-th cooling hole 22 in the current processing is $Z_n$, the amount of change ΔZ of the electrodischarge start position becomes $Z_n - Z_{n-1}$. This amount of change ΔZ is subtracted from the electrode length L1 which is found by the previous processing (L1−ΔZ) and the remainder is set as the new electrode length L1. Note that the electrodischarge start position when using a new pipe electrode 10 to first form a cooling hole 22 (initial electrodischarge start position Z1) may be stored in a memory, a difference ΔZ (=Z1−$Z_n$) between an electrodischarge start position $Z_n$ when forming an n-th cooling hole 22 and the initial electrodischarge start position Z1 may be subtracted from an initial length L0 of the pipe electrode 10 (L0−ΔZ), and the remainder may be set as the new electrode length L1.

At step S6, the machining program is followed to control the drive parts 35 and form a cooling hole 22 of the desired shape in the workpiece 20. At the time of forming the cooling hole 22, the pipe electrode 10 gradually descends.

At step S7, it is judged if the pipe electrode 10 has penetrated through the workpiece 20. This judgment is performed by judging if the average value of the interpolar voltages which are detected by the voltage detection part 34 (average machining voltage V) has become larger than a predetermined threshold value V2. If step S7 is affirmative, the routine proceeds to step S8, while if step S7 is negative, the routine returns to step S6. Note that, below, for convenience, the threshold value V2 is explained as being the same value as the threshold value V1, but V2 and V1 may be values which differ from each other as well. For V1 and V2, suitable values are found in advance by experiments.

At step S8, control signals are output to the drive parts 35 to stop the descent of the pipe electrode 10. In the present embodiment, a signal from the voltage detection part 34 is fetched at short periods (every 2 seconds), so after the workpiece 20 (blade part 21) is penetrated, the pipe electrode 10 can be immediately stopped and the amount of projection of the pipe electrode 10 from the inside surface 21a of the blade part 21 can be kept to a minimum extent.

At step S9, a signal from the position detector 31 is read and the Z-axis position of the electrode holder 7 at the point of time when it is judged that the workpiece has been penetrated is stored as the penetration position (electrodischarge end position) in the memory.

At step S10, the electrodischarge start position which is stored in the memory (step S4) is decreased by the penetration position (step S9) to calculate the amount of feed E of the pipe electrode 10 which is required from electrodischarge start to electrodischarge end (this called substantive feed amount E). The substantive feed amount E includes the plate thickness t of the workpiece 20 and the amount of consumption F (electrode consumption amount) of the pipe electrode 10. The electrode consumption amount F is found by multiplying the plate thickness t and a preset electrode consumption ratio α. The substantive feed amount E is expressed by the following formula (I).

$$E = t(1+\alpha) \tag{I}$$

Note that, strictly speaking, the substantive feed amount E also includes the feed amount of the pipe electrode 10 from the workpiece penetration position, that is, the amount of projection of the pipe electrode 10 from the inside surface 21a, but in the present embodiment, after detection of penetration, the descent of the pipe electrode 10 is immediately made to stop (step S8), so this can be deemed to be 0. The electrode consumption ratio α changes depending on various conditions, but in the present embodiment, an experimentally found average value is set in advance.

At step S11, the electrode length L1 of step S5 is decreased by the electrode consumption amount F (=tα) to calculate the residual length La of the pipe electrode 10. In this case, first, the plate thickness t is found from the above formula (I) and that plate thickness t is multiplied with the electrode consumption ratio α to calculate the electrode consumption amount F. Next, the electrode length L1 is decreased by the electrode consumption amount F to calculate the residual length La.

At step S12, control signals are output to the drive parts 35 (Z-axis use drive part) to make the electrode holder 7, that is, pipe electrode 10, rise, so that the pipe electrode 10 is positioned above the machining start point P of the workpiece 20 by a safety margin. The amount of rise of the electrode holder 7 is made smaller than the substantive feed amount E by exactly an electrode consumption amount F. Due to this, as shown by the solid line in FIG. 5, the pipe electrode 10 sticks out from the bottom end face 8a of the electrode guide 8 by exactly a predetermined amount D2.

At step S13, the length of the pipe electrode 10 required for forming the next cooling hole 22 (required length Lb) is calculated. The required length Lb is found by determining in advance the minimum required length of the pipe electrode 10 for stably holding the pipe electrode 10 without the electrode holder 7 and the electrode guide 8 interfering (minimum required length) and adding to this minimum required length the substantive feed amount E of step S10. The substantive feed amount E is used to find the required length Lb since the currently formed cooling hole 22 and the next formed cooling hole 22 are adjacent and the change in the plate thickness t is believed to be small, so even when forming the next cooling hole 22, a substantive feed amount E the same as the current time is assumed to be necessary. Note that, the minimum required length of the pipe electrode 10 may be set to a value including a predetermined safety margin as well. The minimum required length of the pipe electrode 10 is the sum (for example 45 mm) of the minimum distance of the electrode holder 7 and the electrode guide 8 (for example 5 mm), the length D3 of the electrode guide 8 (for example 30 mm), and the amount of projection D2 from the electrode guide 8 (for example 10 mm).

At step S14, it is judged if the residual length La of the pipe electrode 10 is the required length Lb or more (La≥Lb) of the pipe electrode 10. If step S14 is affirmative, the routine proceeds to step S15, while if step S14 is negative, the routine proceeds to step S16.

At step S15, it is judged that the pipe electrode 10 has sufficient length for forming the next cooling hole 22 and formation of the next cooling hole 22 is permitted. In this case, processing similar to the one explained above is repeated for the machining start point P of the next cooling hole 22. On the other hand, at step S16, it is judged that the pipe electrode 10 is not sufficient in length and electrode replacement is necessary and formation of the next cooling hole 22 is prohibited. In this case, a new pipe electrode 10 is taken out from the tool magazine and processing is performed for attachment to the rotary spindle 6 (electrode replacement processing).

Summarizing the operation of the first embodiment, the following is obtained. Below, the operation after forming the cooling hole 22a of FIG. 2, then forming the adjoining cooling hole 22b will be explained. First, a known length new pipe electrode 10 is positioned above the machining start point P (first machining start point) of the cooling hole 22a and the electrode guide 8 is moved to the electrode support position A (step S1). Next, a pulse voltage is applied to the pipe electrode 10 while making the pipe electrode 10 descend and making the pipe electrode 10 approach the machining start point P at the workpiece surface (step S2).

Figure 8:
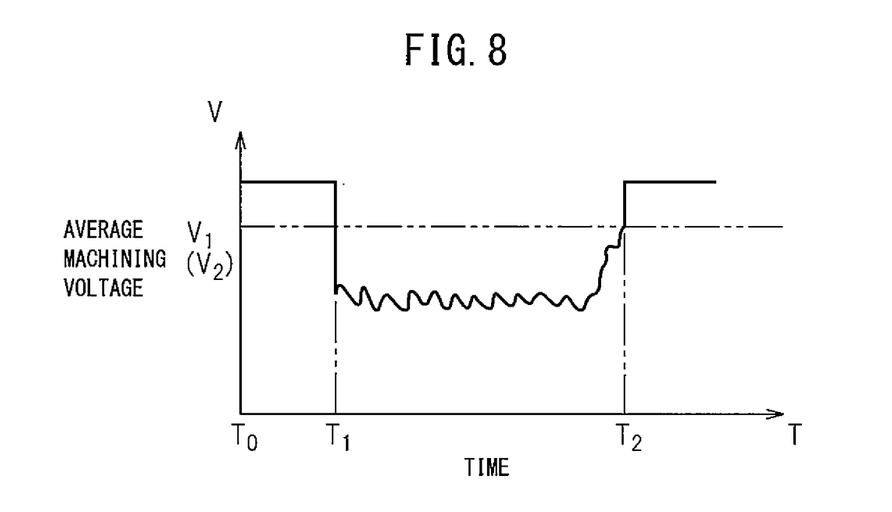
FIG. 8 is a view which shows a relationship between elapsed time from when a pipe electrode starts descending and an average machining voltage between the pipe electrode and a workpiece.

FIG. 8 is a view which shows the relationship of the elapsed time T from when the pipe electrode 10 starts to descend and the average machining voltage V. From the point of time T0 when the pipe electrode 10 starts to descend to when electrodischarge is started, the average machining voltage V is larger than the threshold value V1. If electrodischarge is started at the point of time T1, the average machining voltage V becomes smaller than the threshold value V1. After this, until the electrodischarge ends, the state where V<V1 continues. The Z-axis position (electrodischarge start position) of the electrode holder 7 at this time is stored in the memory (step S4). This electrodischarge start position is used to find and set the electrode length L1 (step S5). Note that, when using a new pipe electrode 10 to form the n-th cooling hole 22, at step S5, the difference $\Delta Z(=Z_n-Z_{n-1})$ between the electrodischarge start position $Z_{n-1}$ when forming the n−1-th cooling hole 22 and the current electrodischarge start position $Z_n$ is subtracted from the electrode length L1 which is found when forming the n−1-th cooling hole 22 (L1−$\Delta Z$) and the remainder is set as the new electrode length L1.

Figure 9:
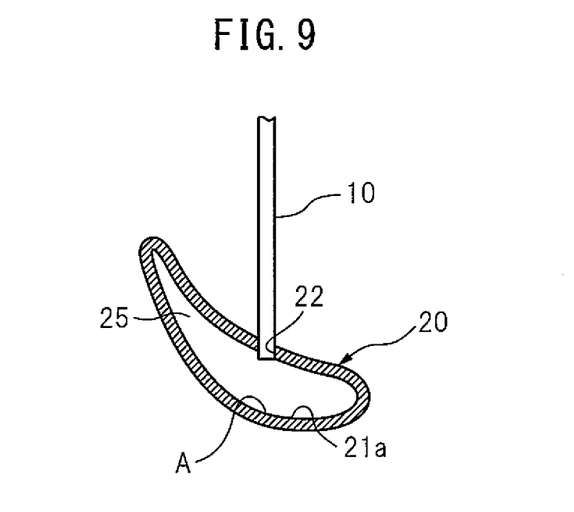
FIG. 9 is a view which explains an advantageous effect which is achieved by the electrode replacement judgment apparatus according to the first embodiment of the present invention.

After that, if, at the point of time T2, the pipe electrode 10 penetrates through the workpiece 20, the average machining voltage V becomes larger than the threshold value V2 (=V1). If V>V2 is detected, the descent of the pipe electrode 10 is stopped (step S8). The Z-axis position of the electrode holder 7 at this time (penetration position) is stored in the memory (step S9). In this case, the signal from the voltage detection part 34 is read by a short period (2 msec), so the pipe electrode 10 can immediately stop after penetrating through the workpiece. Therefore, as shown in FIG. 9, it is possible to prevent the inside surface 21a (part A) of the workpiece 20 at the hollow part side which faces the pipe electrode 10 from being mistakenly machined by the electrodischarge machining.

When the pipe electrode 10 penetrates through the workpiece 20, the pipe electrode 10 moves above the machining start point P (step S12). At this time, the amount of decrease of the penetration position from the electrodischarge start position is calculated as the substantive feed amount E (step S10), the electrode consumption amount F is calculated from the substantive feed amount E, and the value of the electrode length L1 at the time of machining start minus the electrode consumption amount F, that is, the residual length La of the pipe electrode 10, is calculated (step S11). Furthermore, for forming the next cooling hole 22b, it is assumed that an amount of feed of the pipe electrode 10 the same as the substantive feed amount E is necessary and the length Lb of the pipe electrode 10 which is required for forming the cooling hole 22b is calculated (step S13). When the residual length La is the required length Lb or more, it is judged that the pipe electrode 10 is sufficient in length and the machining operation of the next cooling hole 22b is advanced to (step S15). When the residual length La is less than the required length Lb, it is judged that the pipe electrode 10 is insufficient in length and the pipe electrode 10 is replaced without advancing to the machining operation for the next cooling hole 22b.

According to the above first embodiment, the signal from the voltage detection part 34 is used to detect the electrodischarge start position and the penetration position of the pipe electrode 10 (step S4 and step S9), and the electrode length L1 at the time of electrodischarge machining start is decreased by the electrode consumption amount F to detect the residual length La of the pipe electrode 10 (step S11). Furthermore, the difference between the electrodischarge start position and the penetration position (substantive feed amount E) is used as the basis to set the required length Lb of the pipe electrode 10 required for machining the next through hole 22 (step S13) and the residual length La and the required length Lb are compared to judge a need for replacement of the pipe electrode 10 (step S14). That is, it is judged that a substantive feed amount E the same as the current time is needed when forming the next cooling hole 22, the required length Lb of the pipe electrode 10 is calculated, and this required length Lb is used as the basis to judge a need for replacement of the pipe electrode 10. Therefore, the substantive feed amount E is found regardless of the plate thickness t of the workpiece 20, so even in the case where the plate thickness t of the workpiece 20 changes, a need for electrode replacement can be precisely judged.

Figure 10:
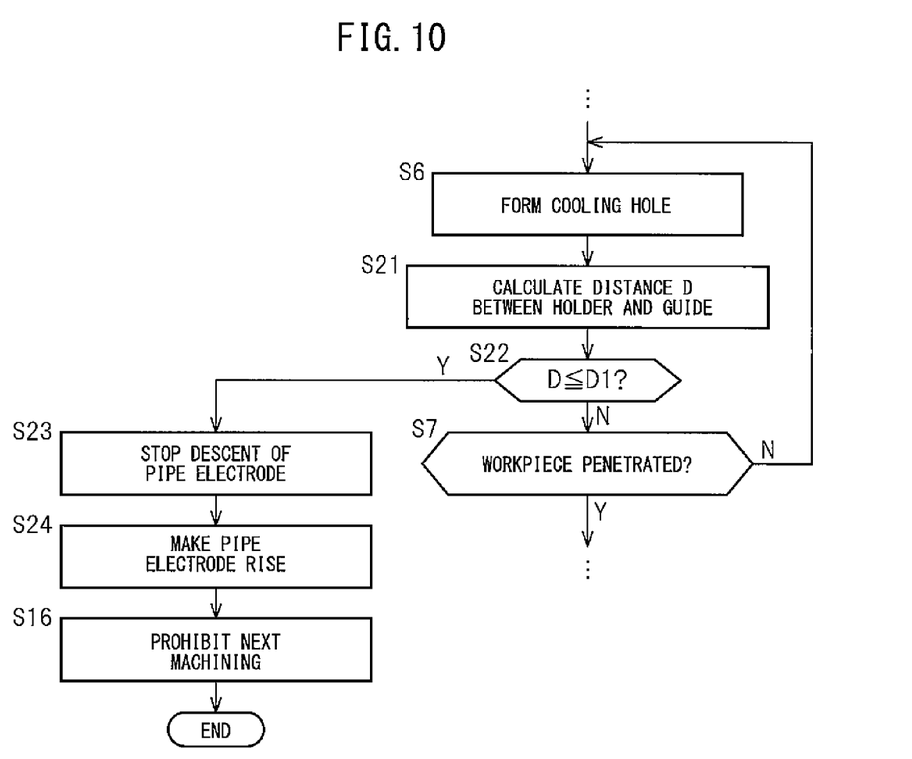
FIG. 10 is a flow chart which shows an example of main processing which is performed by a control part which forms part of an electrode replacement judgment apparatus according to a second embodiment of the present invention.

Referring to FIG. 10, a second embodiment of the present invention will be explained. Note that, below, mainly the points of difference from the first embodiment will be explained. The second embodiment differs from the first embodiment in the processing at the control part 30. That is, in the first embodiment, the pipe electrode 10 is made to descend until detecting penetration through the workpiece 20, but in the second embodiment, the descending operation of the pipe electrode 10 is made to stop if the distance D (FIG. 1) between the electrode holder 7 and the electrode guide 8 becomes a predetermined value D0 or less.

FIG. 10 is a flow chart which shows one example of the processing which is executed by the control part 30 according to the second embodiment and shows mainly parts which differ from FIG. 7. Note that, in FIG. 10, parts of the processing the same as in FIG. 7 are assigned the same reference notations. As shown in FIG. 10, if starting the processing for forming a cooling hole 22 at step S6, the routine proceeds to step S21 where the signals from the position detectors 31 and 32 are used as the basis to calculate the distance D between the electrode holder 7 and the electrode guide 8. At step S22, it is judged if the calculated distance D is the preset predetermined value D0 or less. This judgment judges if there is any interference (collision) between the electrode holder 7 and the electrode guide 8. The predetermined value D0 is set to a value larger than at least 0, for example, to 5 mm. If step S22 is negative, the routine proceeds to step S7, then processing similar to FIG. 7 is performed.

On the other hand, if step S22 is affirmative, the routine proceeds to step S23 where control signals are output to the drive parts 35 and the descent of the pipe electrode 10 is stopped. At step S24, control signals are output to the drive parts 35 (Z-axis use drive part) so that the pipe electrode 10 is positioned above the machining start point P of the workpiece 20 and the electrode holder 7 is made to rise. Next, at step S16, it is judged that the pipe electrode 10 is not sufficient in length and electrode replacement is necessary and formation of the next cooling hole 22 is prohibited.

In the second embodiment, if the distance D between the electrode holder 7 and the electrode guide 8 becomes a predetermined value D0 or less, the descent of the electrode holder 7 is stopped, so even if the workpiece 20 suddenly increases in plate thickness t at the machining start point P etc., the electrode holder 7 and the electrode guide 8 can be prevented from colliding. That is, if the plate thickness t of the workpiece 20 at the time of the current machining operation suddenly increases from the plate thickness t of the workpiece 20 at the time of the previous machining operation, the substantive feed amount E of the pipe electrode 20 which is required until penetration through the workpiece increases, and the electrode holder 7 and the electrode guide 8 are liable to collide before detecting penetration through the workpiece. On this point, in the present embodiment, if the distance D between the two becomes a predetermined value D0 or less, the descent of the electrode holder 7 is forcibly stopped, so the electrode holder 7 and the electrode guide 8 can be prevented from colliding.

In the above embodiments, the electrodischarge start position and the penetration position are detected in accordance with the interpolar voltage V which is detected by the voltage detection part 34, but the electrodischarge start position detecting means and the penetration position detecting means are not limited to this in configuration. For example, the interpolar voltage V has correlation with the feed rate of the pipe electrode 10, so it is possible to detect the electrodischarge start position and penetration position by detecting the feed rate. In the above embodiments, processing at the control part 30 is performed to decrease the electrode consumption amount F from the electrode length L1 at the time of start of electrodischarge machining to find the residual length La of the pipe electrode 10, but the electrode length detecting means is not limited to this in configuration.

If using the difference between the electrodischarge start position and the penetration position (substantive feed amount E) as the basis to find the required length Lb of the pipe electrode 10 which is required for machining the next through hole 22, the required length setting means (control part 30) may be configured in any way. For example, instead of using the substantive feed amount E which is obtained at the time of machining the immediately preceding cooling hole 22, it is also possible to use the average value of the substantive feed amounts E which are obtained at the time of forming several immediately preceding (for example five) cooling holes 22. Processing at the control part 30 is used to judge the need for electrode replacement in accordance with the relative sizes of the residual length La and the required length Lb of the pipe electrode 10, but if comparing the residual length La and the required length Lb, the judgment by the judging means need not be such simple judgment of relative sizes.

In the above embodiments, the base end part of the pipe electrode 10 is held at the electrode holder 7 and the front end part of the pipe electrode 10 is held by the electrode guide 8 which can move relative to the electrode holder 7 in the length direction of the pipe electrode 10, but the first holding part and second holding part are not limited to this configuration. The position detectors 31 and 32 are used to calculate the distance between the electrode holder 7 and the electrode guide 8, but the distance detecting means may be any means. If, after the start of electrodischarge, the distance D between the electrode holder 7 and the electrode guide 8 becomes the predetermined value D0 or less, the processing at the control part 30 is used to stop the descent of the electrode holder 7, but the electrodischarge stopping means for making the electrodischarge machining operation stop is not limited to the above in configuration.

In the above embodiments, if the comparison of the residual length La and the required length Lb of the pipe electrode 10 resulted in judgment that electrode replacement is necessary, the processing at the control part 30 is used to prohibit advance to the process for forming the next cooling hole (next machining process), but the electrodischarge control means is not limited to this in configuration. For example, at the time of prohibiting advance to the next machining process, an alarm may be output to the display part 36. In the above embodiments, a pipe shaped electrode 10 is used, but the shape of the electrode which extends in the long direction may be one other than a pipe shape. The electrodischarge machine 100 is not limited to the above in configuration. In the above embodiments, as one example of a workpiece 20, a turbine blade is used, but the replacement judgment apparatus according to the present invention may be applied even when machining another workpiece so long as the workpiece requires formation of a plurality of through holes 22. Further, the replacement judgment apparatus according to the present invention may be applied even when there are a plurality of workpieces in each of which just a single through hole is to be formed and the workpieces are successively exchanged so as to successively form the through holes by electrodischarge machining.

In the above embodiments, a replacement judgment method of an electrode for electrodischarge machining which judges a need for replacement of an electrode (pipe electrode) 10 for successively forming a plurality of through holes 2 in a workpiece 20 by electrodischarge machining is explained. That is, the residual length La of the electrode 10 is detected, the position of the electrode 10 at the time of start of electrodischarge is detected as the electrodischarge start position, the position of the electrode 10 at the time of penetration through the workpiece is detected as the penetration position, the difference between the detected electrodischarge start position and the detected penetration position is used as the basis to set the required length Lb of the electrode 10 which is required for forming the next through hole 22, and the detected residual length La and the set required length Lb are compared to judge a need of the electrode replacement. In this case, the position of the electrode 10 includes a position of the member which has correlation with the electrode 10 (electrode holder 7 etc.)

According to the present invention, the most recent actual data of the through holes, that is, the difference of the electrodischarge start position and the penetration position, is used as the basis to set the required length of the electrode which is required for forming the next through hole and this required length is used to judge a need for electrode replacement, so regardless of any change of the workpiece in plate thickness, a need for electrode replacement can be precisely judged. In particular, normally the electrode consumption amount changes depending on the machining state (extent of stability or instability), machining depth, and machining fluid pressure, but the present invention uses the most recent data, so the various conditions are substantially the same. It is possible to precisely judge the need for electrode replacement without waste. Further, compared with the method of measuring the electrode length before forming and after forming one through hole and detecting the electrode consumption amount, the cycle time can be greatly shortened.

REFERENCE SIGNS LIST 7 electrode holder
8 electrode guide
10 pipe electrode
20 workpiece (turbine blade)
22 cooling hole
30 control part
31, 32 position detector
34 voltage detection part
35 drive part
La residual length
Lb required length

The invention claimed is:

1. A replacement judgment apparatus for an electrode for electrodischarge machining which judges a need for replacement of an electrode which successively forms through holes in a workpiece by electrodischarge machining, the apparatus comprising a CPU and a memory having a computer program stored thereon, the computer program, when executed by the CPU, generating the instructions comprising:
   detecting a residual length of the electrode;
   detecting a position of the electrode at the time of start of electrodischarge as an electrodischarge start position;
   detecting a position of the electrode at the time of penetration through the workpiece as a penetration position;
   using a difference between the detected electrodischarge start position and the detected penetration position as the basis to set a required length of the electrode which is required for machining the next through hole; and
   comparing the detected residual length and the set required length to judge the need for electrode replacement.

2. The replacement judgment apparatus for the electrode for electrodischarge machining according to claim 1, further comprising:
   a first holding part which holds a base end part of the electrode;
   a second holding part which is provided to be able to move relative to the first holding part in a length direction of the electrode and which holds a front end part of the electrode;
   wherein the instructions further comprise detecting a distance between the first holding part and the second holding part, and stopping making an electrodischarge machining operation stop when the detected distance becomes a predetermined value or less.

3. The replacement judgment apparatus for the electrode for electrodischarge machining according to claim 1, wherein the instructions further comprise detecting an interpolar voltage between the electrode and the workpiece and detecting the position of the electrode when the interpolar voltage exceeds a predetermined value as the penetration position.

4. The replacement judgment apparatus for the electrode for electrodischarge machining according to claim 1, wherein the instructions further comprise permitting advance to the next machining process for forming the next through hole when it is judged that electrode replacement is not necessary and prohibiting advance to the next machining process when it is judged that electrode replacement is necessary.

5. A replacement judgment method for an electrode for electrodischarge machining which judges a need for replacement of an electrode which successively forms through holes in a workpiece by electrodischarge machining comprising:
   detecting a residual length of the electrode;
   detecting a position of the electrode at the time of start of electrodischarge as an electrodischarge start position;
   detecting a position of the electrode at the time of penetration through the workpiece as a penetration position;
   using a difference between the detected electrodischarge start position and the detected penetration position as the basis to set a length of the electrode which is required for machining the next through hole; and
   comparing the detected residual length and the set required length to judge the need for electrode replacement.

* * * * *